UNITED STATES PATENT OFFICE.

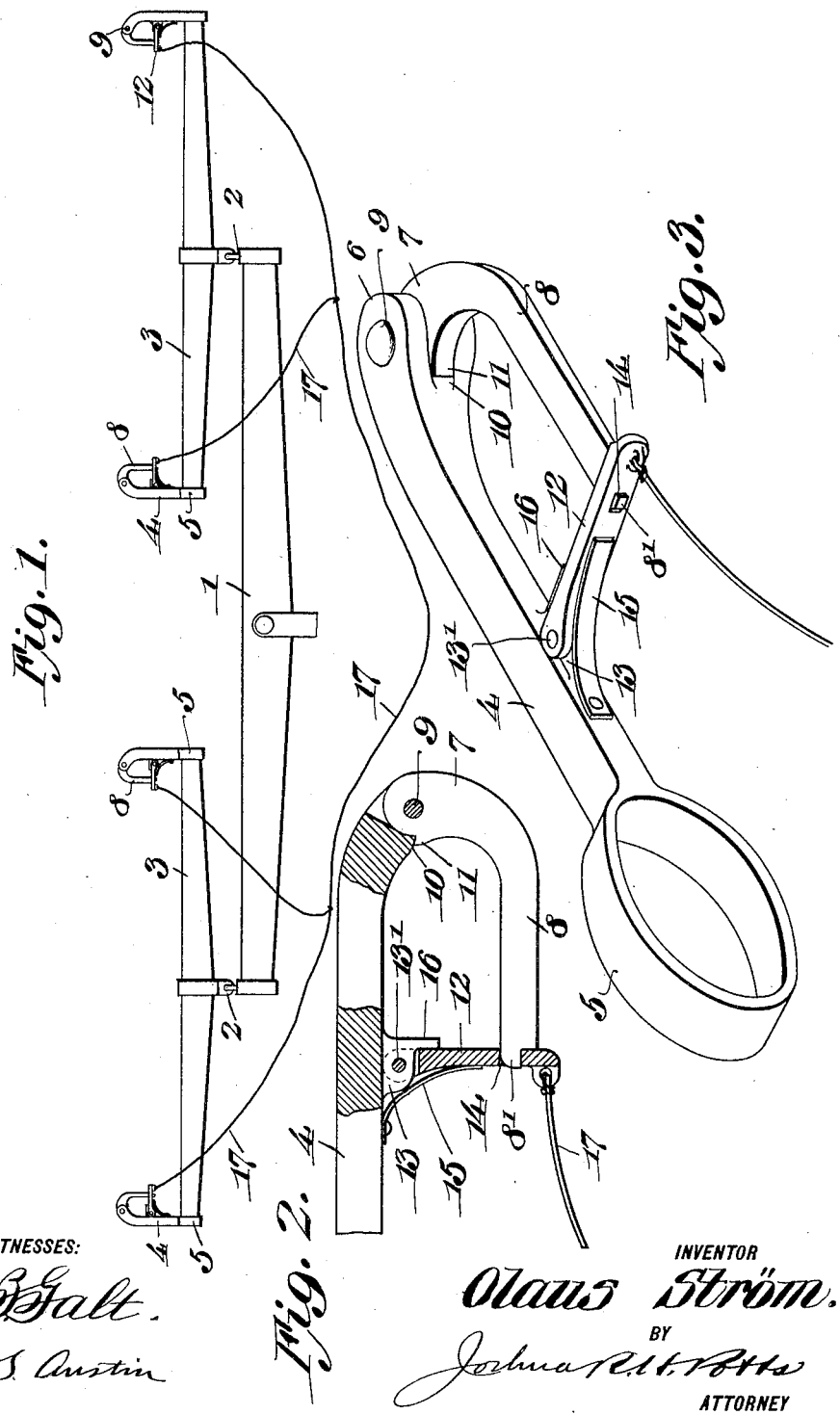

OLAUS STRÖM, OF FERTILE, MINNESOTA.

HORSE-DETACHER.

1,086,412.  Specification of Letters Patent.  Patented Feb. 10, 1914.

Application filed July 17, 1913. Serial No. 779,417.

*To all whom it may concern:*

Be it known that I, OLAUS STRÖM, a subject of the King of Sweden, residing at Fertile, county of Polk, and State of Minnesota, have invented certain new and useful Improvements in Horse-Detachers, of which the following is a specification.

This invention relates to horse detachers and is particularly adapted to be used in connection with horse drawn vehicles.

The primary object of my invention is to provide means upon a vehicle to which the traces or other draft harness worn by the animal may be securely attached and which may, at the option of the driver, be operated to release the horses from the vehicle.

A further object is to provide upon the ends of the swingle tree of a vehicle a device of such construction that the traces or other draft harness may be easily and quickly attached thereto without the possibility of accidental displacement, and which may be operated to detach the draft animals at the option of the driver.

A still further object is to provide a device characterized as above, which may be operated to release the animals by the driver of the vehicle while in the seat.

With the above objects in view my invention comprises generally means secured to the front of a vehicle to which the ends of the traces are attached, and so arranged as to be operated to release the traces should the animals become frightened.

My invention further consists in a device permanently secured to each end of the swingle trees, a movable jaw pivotally mounted thereon to which the ends of the traces are secured, a spring actuated member to hold the pivoted jaw in closed position and means whereby the spring actuated member may be operated to release the pivoted jaw.

My invention further consists in the novel arrangement and combination of parts all as will be described hereinafter, shown in the drawings and particularly pointed out in the claim.

In the drawings: Figure 1 is a plan view of a double tree and swingle trees, and illustrating the general application of a device constructed in accordance with my invention, Fig. 2 is an enlarged fragmentary plan view of one of my improved hooks, parts being shown in section, and Fig. 3 is a detail perspective view of one of the hooks.

For the purpose of fully illustrating the utility of my invention, I have shown in the drawings my device as applied to a vehicle drawn by a double team, but it is obvious that the same may be used with equal facility upon vehicles equipped for any number of draft animals.

Referring now more particularly to the drawings, 1 represents generally a double tree, secured to the tongue or body of the vehicle in any preferred manner, and which is provided at its opposite ends with eyes 2 in order that the swingle trees 3 may be supported.

Each end of the swingle trees is provided with my improved hook member as will now be more particularly described, and, each being constructed alike, the description of one will suffice for all. The trace hook is formed preferably of metal, and comprises a shank 4 secured at one end to the swingle tree and constructed at its outer end to receive a movable jaw member. This shank may be secured to the swingle tree in any approved style for convenience, however in the present instance, a loop 5 is formed at the inner end thereof to fit over and be secured to the extremity of the swingle trees. The outer end of the shank 4 curves inwardly and is bifurcated at 6 to receive the end 7 of a movable jaw 8. The trace retaining jaw 8 is substantially J-shaped, being enlarged at its curved end 7 to engage within the bifurcated end of the shank 4. A pin 9 pivotally connects this jaw with the shank. The opposite end of the jaw is reduced as at 8′ for a purpose to be more fully described later. The base of the bifurcated portion of the shank 4 is provided with a shoulder 10, which, through its coöperation with the shoulder 11 upon the movable jaw 8, limits the inward movement thereof.

To hold the jaw 8 in closed position, a latch member 12 is pivotally mounted upon an ear 13 to the shank adjacent the free end of the jaw 8, and is provided with an opening 14 into which the reduced end 8′ of the movable jaw 8 is adapted to fit. A spring 15 is secured to the shank 4 which tends normally to hold the latch in engagement with the end of the jaw 8, while a lug or stop 16 is provided upon the ear 13 at the opposite side of the latch 12 to limit its forward movement. A cord 17 is attached to the free end of the latch in order that the latch may be withdrawn from engagement with the end of the jaw. The arrangement of the stop 11 of the jaw 8 with the shoulder 10 of the bifurcated portion, and the stop 16 adjacent the inner edge of the latch 12 is such that when these movable elements have reached the limit of their inward movements the free end 8′ of the jaw will be positioned within the opening 14. It will be noted that the reduced portion 8′ of the jaw, and the extreme end of the latch 12 are rounded in order that the jaw member may be snapped in locked position without the necessity of manually retracting the latch 14.

In operation the openings in the trace ends are engaged over the jaw members 8, and the jaw members then moved inwardly until engaged in the openings 14 in the latch members 12. The strain of the draft animals is taken up by the pivot pin 9, the slight outward strain of the jaw being taken up by the pivot 13′ of the latch. Should it become necessary for any reason to detach the animals from the vehicle, a slight pull upon the cord 17 will withdraw the latch 12 to free the movable jaw, and the trace ends are disengaged thereupon at once. As illustrated diagramatically in Fig. 1, the ends of the several cords 17 attached to the various latches may be connected and extended to a position conveniently within reach of the driver, so that, one pull upon the cord will simultaneously operate the several latches.

It is obvious that a vehicle equipped with an animal detacher as above described will insure safety to the occupants of the vehicle, as, in case the animals become frightened, a slight pull on the latch cord instantly liberates them, and smash ups and other accidents are averted.

The simple construction and arrangement of the several parts of my invention makes the same readily applicable to any vehicle drawn by draft animals, and the novel assemblage of the same reduces the chances of breakage or derangement to a minimum.

What I claim is:

In a horse detacher, a shank secured at one end to a swingle tree and provided at its opposite end with a bifurcated portion, a J-shaped jaw pivoted at one end to said bifurcated portion, a stop on said jaw adapted to abut said bifurcated portion to limit the inward movement of said jaw, a latch member pivoted to said shank and provided with an opening to receive the free end of said jaw, a spring adapted normally to hold said latch in extended position, a stop adjacent said latch to limit the inward movement of the same, the arrangement of the stop adjacent said latch and the said stop on said jaw being such that when their respective elements are limited in their inward movements thereby, the free end of said jaw will be positioned within said opening, and a cord attached to said latch for retracting the same, substantially as described.

In testimony whereof I have signed my name to this specification in the presence of two subscribing witnesses.

OLAUS STRÖM.

Witnesses:
HANS PAULSRUD,
N. E. ERIKSON.

Copies of this patent may be obtained for five cents each, by addressing the "Commissioner of Patents. Washington, D. C."